Aug. 5, 1952  E. R. OVERMAN  2,605,841
DRIVE FOR FLYING KNIVES
Filed June 6, 1949  2 SHEETS—SHEET 1

INVENTOR.
EARL R. OVERMAN,
BY: Harold B. Hood.
ATTORNEY.

Aug. 5, 1952 E. R. OVERMAN 2,605,841
DRIVE FOR FLYING KNIVES
Filed June 6, 1949 2 SHEETS—SHEET 2

INVENTOR.
EARL R. OVERMAN,
BY: Harold B. Hood.
ATTORNEY.

Patented Aug. 5, 1952

2,605,841

UNITED STATES PATENT OFFICE 2,605,841

DRIVE FOR FLYING KNIVES

Earl R. Overman, Wabash, Ind.

Application June 6, 1949, Serial No. 97,465

15 Claims. (Cl. 164—76)

The present invention relates to a drive for a flying knife, and is an improvement upon a part of the invention disclosed and claimed in my copending application Serial No. 762,362, filed July 21, 1947, for Batting Machine. The primary object of the invention is to provide a machine capable of accurately producing transverse severing cuts in a stream of mineral wool batting, or the like, without interrupting the flow of that stream.

A further object of the invention is to produce a machine having the above capabilities, but simplified as compared with the transverse severing device disclosed in my said copending application.

In order satisfactorily to produce such transverse cuts in material of the character primarily under consideration, it is essential that the blade means shall project beyond the plane upon which the flowing stream of material is supported. While it is customary to support such material upon a slatted type, continuous conveyor, it will be obvious that, if the blade-supporting carriage is driven by any means not mechanically connected to the conveyor, such synchronism between the conveyor and the blade-supporting carriage as will insure registry of the blade with a space between slats on the conveyor whenever a cut is made, cannot inevitably be maintained.

For that reason, in the machine disclosed in my said copending application, the stream of material to be severed was caused to flow over an elevated platform supported upon the blade-supporting carriage, being thereby lifted above the main conveyor in one region. Since that platform, with the carriage, was required to reciprocate relative to the moving conveyor, difficulty was sometimes experienced in maintaining smooth and continuous flow of the batting material.

It is an object, then, of the present invention to provide drive means for the blade-supporting carriage which will at all times inevitably insure registry of the blade with a space between slats of the main conveyor, during severing operations.

I prefer to provide drive means for the blade-supporting carriage directly carried by, and moving with, the slatted conveyor in order to accomplish this function. Since the conveyor continuously moves in one direction, and since the blade-supporting carriage must reciprocate relative thereto, it follows that, when the driving connection between the conveyor and the blade-supporting carriage is established, the carriage will be either at rest or moving in a direction opposite the direction of movement of the conveyor, so that a heavy stress will be impressed upon the machine parts at the instant of establishment of such connection. While it would be possible to make the parts of the machine heavy enough to withstand such stress, I prefer to provide auxiliary means for imparting to the blade-supporting carriage a driving impulse, substantially coincident with the establishment of the driving connection between the conveyor and such carriage; and it is an object of the present invention to provide, in an organization of the character here under consideration, such an auxiliary means automatically activated to synchronize the delivery of such auxiliary driving impulse with the establishment of such driving connection.

In the machine of the present invention, the cutting means is caused to traverse the flowing stream of material, while intersecting the conveyor surface upon which such material is supported; and therefore it is essential that the path of transverse travel of such blade shall be precisely parallel to the slats of which such surface is made up. It is an object of the present invention, then, to provide improved means for properly aligning the travel path of such blade, and for maintaining such accurate alignment throughout the life of the machine.

Further objects of the invention will appear as the description proceeds. To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
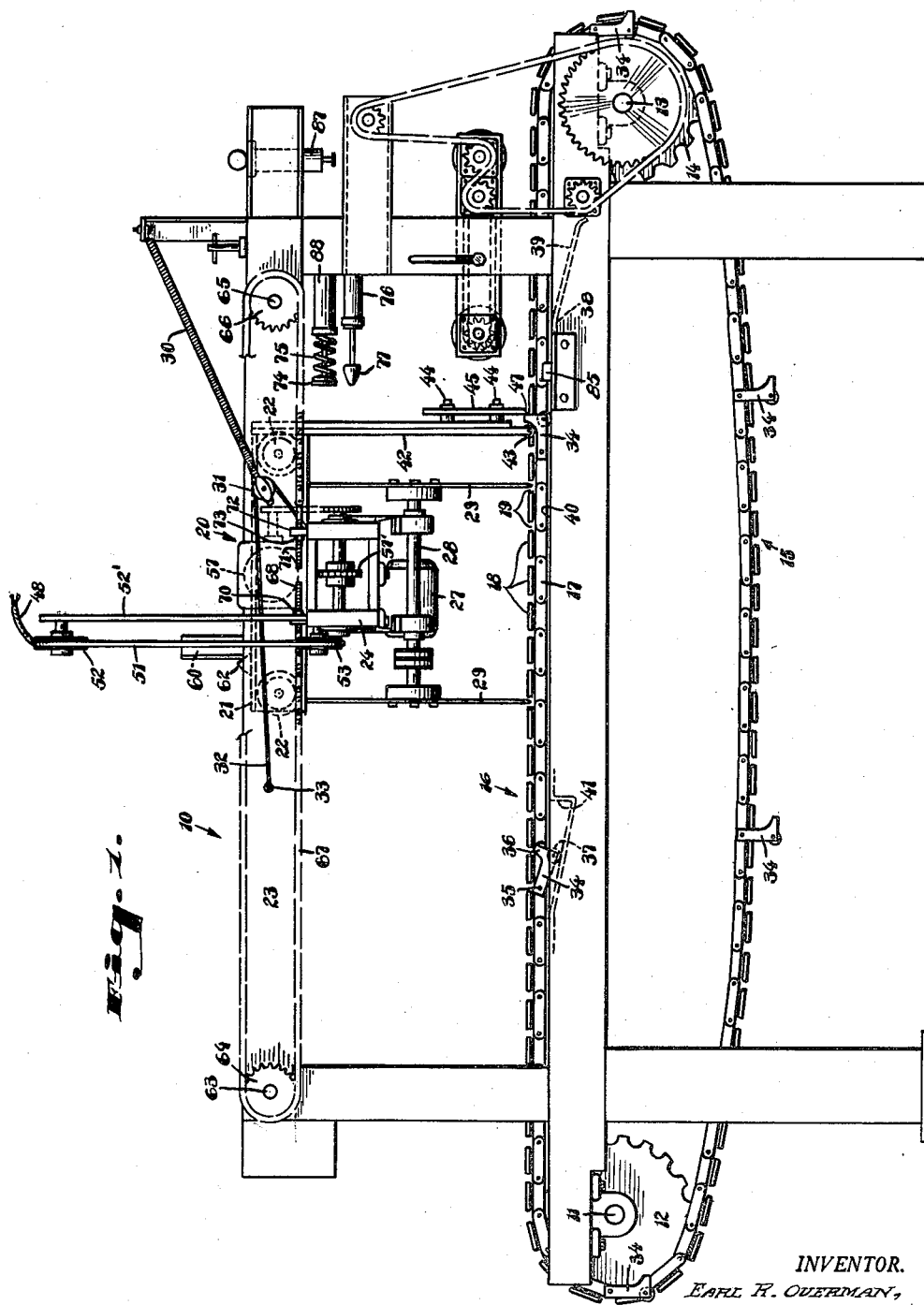
Fig. 1 is a side elevation of a machine embodying the present invention.

Referring more particularly to the drawings, it will be seen that I have shown a machine comprising a main frame generally indicated by the reference numeral 10 and supporting, at one end, a transverse shaft 11 upon which sprockets 12 are mounted adjacent the lateral sides of the main frame. A similar shaft 13, supporting similar sprockets 14, is mounted at the other end of the frame; and an endless conveyor or traveller, indicated generally by the reference numeral 15, is trained over said sprockets with one run, indicated generally by the reference numeral 16, arranged to move continuously in one direction longitudinally of said frame. The conveyor 15, according to standard practice, may comprise two side chains 17 joined by transversely extending slat members 18 spaced longitudinally of the conveyor to define transversely-extending openings 19 therebetween.

A unit 20, which may be referred to as a boom, is mounted for longitudinal reciprocation upon the frame 10, being provided, at each end, with a runner 21 supported upon wheels 22 which, in turn, are supported upon track means or trackways 23 at the lateral sides of the machine, said trackways being disposed laterally beyond the respective lateral edges of the conveyor 15. The unit 20 further comprises a trackway 24 spanning the conveyor and supporting the wheels 25 of a carriage 26 upon which is mounted a motor 27 connected to drive a shaft 28 which may support one or more rotary knife blades or cutter means 29, 29. The parts are so proportioned and designed that the blades 29 extend slightly below the upper surfaces of the slats 18, and that the carriage 26 is reciprocable between a position in which the blades 29 are wholly beyond one lateral edge of the conveyor 15 and a position in which said blades are wholly beyond the opposite lateral edge of said conveyor.

It will be seen that the unit 20 is supported for travel in opposite directions in the line of travel of the conveyor 15. Means is provided for resiliently resisting travel of said unit in the direction of movement of the conveyor run 16, such means being capable, when unresisted, of moving said unit to the right-hand end of its travel path, as viewed in Fig. 1. As shown, such means comprises, at each side of the machine, a heavy coiled spring 30 having one end anchored on the machine frame and carrying at its opposite end a sheave 31 through which is threaded a cable 32, one end of said cable being anchored on the unit 20, and the other end thereof being anchored, as at 33, upon the frame 10.

Each chain 17 carries, at suitably longitudinally spaced points, a plurality of elements which may be referred to as dogs 34. Each dog is pivoted, as at 35, to its chain, and has a finger 36 which, when the dog occupies the position illustrated at the right-hand end of Fig. 1, projects above the horizontal plane of the run 16. Each dog further carries a roller 37 in whose path is disposed a cam trackway 38. The dogs normally hang substantially vertically downward from their chains; but as each dog reaches the right-hand end of the track 38, its roller 37 engages means comprising an inclined surface 39 which merges with a land 40. At an appropriate point near the left-hand end of Fig. 1, the trackway 38 drops off in a sharp shoulder 41, for a reason which will become apparent.

Near each lateral end, the unit 20 carries a depending bracket 42 whose lower end supports a roller 43 providing an abutment surface disposed in the pathway of the fingers 36 of the dogs 34 as the rollers of said dogs follow the lands 40. Thus, as each dog reaches the position of the roller 43, it will engage its corresponding roller 43 to establish a driving connection between its chain 17 and the associated bracket 42 of the unit 20, whereby said unit 20 will be carried toward the left, as viewed in Fig. 1, in absolute synchronism with the conveyor run 16. The finger 36 of each dog 34 is so related to one of the spaces 19, and each knife 29 is so related to the brackets 42 that, when such driving connection is established, each knife 29 is in absolute registry with a space 19, and that relationship will, of course, be maintained throughout the continuation of such driving relation.

Figures 2, 3:
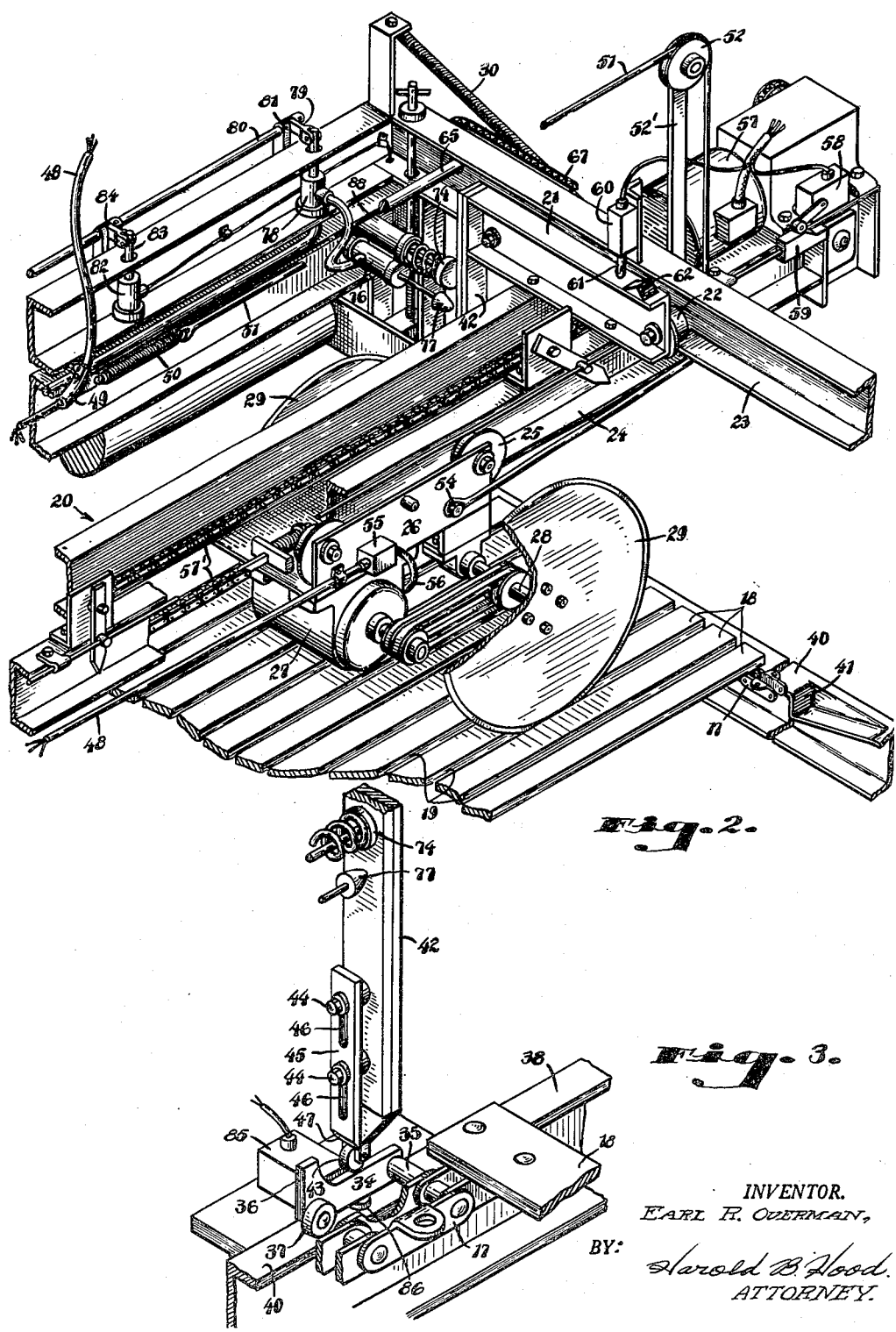
Fig. 2 is an enlarged fragmentary perspective view showing the operating parts of my improved mechanism.
Fig. 3 is a further enlarged fragmentary perspective, taken at a different angle, and showing details of the means for establishing the driving connection between the conveyor and the unit upon which the cutting blades are supported.

I prefer to provide latch means positively preventing any possibility that the unit 20 may be so accelerated as to run even momentarily ahead of the fingers 36. As is most clearly shown in Fig. 3, each bracket 42 is provided with a pair of posts 44 projecting rearwardly from said bracket; and a latch plate 45, formed with longitudinally extending slots 46 for the reception of said posts, is loosely mounted thereon, said latch plate being spaced from its bracket by a distance substantially equal to the dimension of the finger 36 in the direction of conveyor movement. Each latch plate is normally held by gravity in its position illustrated in Fig. 3, wherein its lower, cammed end 47 is directly in the path of the upper end of the finger 36. As said finger moves forwardly, its leading face will strike the cam face 47 to elevate the latch plate 45, whereby the finger is permitted to move beneath and past the latch plate, and so into driving engagement with its roller 43, whereupon the latch plate will drop by gravity into engagement with the trailing end or surface of the finger 36 to imprison said finger between said roller and said latch plate in the manner illustrated in Fig. 1.

The motor 27 is preferably continuously energized during operation of the machine. A flexible electric power line 48 is led to the machine through a fitting 49, to one end of which is connected a spring 50 anchored upon a flexible cable 51. Said cable is led transversely of the machine to and around a pulley 52 supported upon a mast 52' carried on the units 20, thence around a pulley 53, and so to an anchorage 54 on the carriage 26. The power line 48 continues in the opposite direction from the fitting 49 to pass about other pulleys, similar to pulleys 52 and 53, at the opposite side of the machine, and so to a junction box 55 on the carriage 26. Leads 56 extend from said junction box to the motor 27. This arrangement, of course, facilitates energization of the motor 27 during travel of the carriage 26 throughout the length of the trackway 24.

A reversible motor 57, mounted on the unit 20, is connected, through a chain 57', to drive the carriage 26 in opposite directions over the trackway 24, the direction of energization of said motor being controlled by a switch mechanism indicated generally at 58 and dominated by a shifting element 59. This mechanism is disclosed and claimed in my said copending application, and, since it forms no part of the present invention, will not herein be described in detail.

Energization of the motor 57 is controlled through a switch 60 having an actuating element 61 disposed in the path of a cam 62 carried on the unit 20, the arrangement being such that, as the unit 20 leaves its position of rest, the cam 62 engages the actuating element 61 to energize the motor 57 an instant after travel of the unit 20, in the direction of movement of the conveyor 15, has been begun.

Near one end, the frame 10 supports a transverse shaft 63 located beyond the adjacent end of the travel path of the unit 20, said shaft having fixed to its opposite ends rotary means such as sprockets 64. A similar shaft 65, located beyond the opposite end of the travel path of the unit 20, similarly carries sprockets 66. Flexible strand means such as a chain 67 is trained over the sprockets 64 and 66 at each side of the machine. One end of the chain 67 carries a threaded bolt 68 which passes through a suitable opening in the mast 52' and is adjustably fixed with respect to said mast by a nut 70. The other end of the chain carries a bolt 71 passing through a lug 72 on the unit 20, and is adjustably fixed with respect to said lug by means of a nut 73. It will be obvious that, by adjustment of the nuts 70 and 73, the adjacent end of the unit 20 may be shifted in the direction of length of the frame 10, and that the opposite ends of the unit 20 may be independently so shifted. It will further be obvious that, once a suitable adjustment has been so effected, the relative positions of the two ends of the unit 20 will be indefinitely maintained by the chains 67 which pass over sprockets 64 and 66 fixed, respectively, to the shafts 63 and 65.

As the rollers 37 reach the shoulders 41 in the trackways 38, the dogs will drop away from the rollers 43 to release the unit 20 from the conveyor run 16. Immediately, the springs 30 will withdraw the unit 20, shifting it quickly toward the right as viewed in Fig. 1. Since the unit 20 will presumably be moved rapidly during its return, I prefer to provide shock absorbing buffers 74 near the right hand end of its travel path to be engaged by the brackets 42, said buffers being backed by springs 75, and, if desired, by hydraulic or pneumatic energy-absorbing means of suitable construction as suggested at 88. The driving train for the carriage 26 is, of course, of such character that said carriage will complete its run from one end of the trackway 24 to the other before the dogs 34 drop off the shoulders 41.

As has been said, I prefer to provide auxiliary means for initially accelerating the unit 20 in the direction of movement of the conveyor run 16. In a preferred form, I mount fluid motors 76 upon the frame 10 adjacent the right-hand end of the travel path of the unit 20, each such motor including a member or piston 77 shiftable, under the influence of fluid under pressure, toward the left as viewed in Fig. 1. In the illustrated embodiment of my invention, I provide means for activating each motor 76, comprising a control valve 78 having a valve element mechanically connected to an arm 79 on a rock shaft 80 supported in suitable bearings 81 on the machine frame. As shown, I provide a solenoid 82 whose core 83 is connected to an arm 84 fixed to the rock shaft 80, said solenoid being under the control of a switch 85 having an actuating lever 86 disposed in the paths of the dogs 34. Thus, as each dog approaches driving engagement with the roller 43, it will engage the switch arm 86 to energize the solenoid 82 to rock the shaft 80 to open the valves 78, whereby a supply of fluid under pressure is delivered to the motors 76. The pistons 77 are thereby projected to deliver a driving impulse to the brackets 42, whereby the unit 20 is started, in the direction in which it is to be moved by the dogs 34, concurrently with the establishment of the driving connection between the conveyor 15 and said unit 20. The solenoid 82 and its switch 85 with lever 86 comprises, of course, relay means for actuating the valve 78.

I prefer to provide pressure regulator means 87 of suitable characteristics for adjustably determining the magnitude of the impulse thus to be delivered to the unit 20 by the motors 76.

I claim as my invention:

1. In a device of the class described, a frame, a conveyor supported on said frame and having a run adapted to travel longitudinally of said frame, a boom supported on said frame and extending transversely of said frame, said boom being movable longitudinally of said frame, cutter means carried by said boom and operable, at times, to sever transversely material supported on said conveyor, a plurality of elements moving with said conveyor and spaced longitudinally of said conveyor, means on said frame and cooperable with any one of said elements to shift such one element into driving engagement with said boom, a fluid motor including a shiftable member cooperable with said boom, at times, to impart to said boom a driving impulse in the direction of travel of said conveyor run, means for driving said conveyor, and means for activating said fluid motor, substantially concurrently with the establishment of such driving connection of an element with said boom, to initiate movement of said boom in synchronism with said conveyor run.

2. In combination, an endless traveller, means for driving said traveller to move one run thereof continuously in one direction, a unit spanning said traveller and mounted for reciprocation substantially in the line of movement of said traveller run, means resiliently resisting movement of said unit in the direction of movement of said traveller run, means moving with said traveller and operable, at times, to effect a driving connection with said unit, a fluid motor including an element movable in the direction of movement of said traveller run to deliver a driving impulse to said unit in said direction upon activation of said motor, and means for activating said motor substantially concurrently with the establishment of such driving connection between said means moving with said traveller and said unit.

3. The organization of claim 2 in which said movement-resisting means is operable, upon disestablishment of said driving connection, to shift said unit in a direction opposite the direction of movement of said traveller run.

4. The organization of claim 2 in which said means for activating said motor comprises a source of fluid under pressure, valve means controlling fluid flow from said source to said motor, and relay means positioned in the path of an element moving with said traveller run and engaged by said element to open said valve means substantially concurrently with the establishment of such driving connection.

5. The organization of claim 2 in which said means moving with said traveller comprises a dog, in which said unit is provided with an abutment surface projecting into the path of said dog, and in which said unit is further provided with latch means spaced from said abutment surface, said latch means being shiftable relative to said surface to permit engagement of said dog between said surface and said latch means.

6. The organization of claim 5 in which said latch means is provided with a cam face positioned to be engaged by said dog before said dog engages said surface, said latch means being shiftable, under the force exerted by said dog against said cam face, out of the path of said dog, and said latch means further being mounted to return, after passage of said dog, substantially into engagement with the trailing surface of said dog upon engagement of the leading face of said dog with said abutment surface.

7. The organization of claim 5 in which said abutment surface is substantially vertical and in which said latch means comprises a plate, means projecting from said unit in a direction opposite the direction of movement of said traveller run, said latch plate being mounted on said projecting means for limited substantially vertical reciprocation, the distance between said abutment surface and the adjacent face of said latch plate being substantially equal to the dimension of the abutment-surface-engaging portion of said dog in the direction of movement of said traveller run, and said latch plate being provided with a cam face disposed in the advancing path of said dog, whereby said latch plate will be shifted vertically out of the path of said dog when struck by said dog and will fall into blocking relation with said dog after engagement of said dog with said abutment surface.

8. In a device of the class described, a frame, an endless traveller supported on said frame, means for driving said traveller to move one run thereof continuously in one direction longitudinally of said frame, longitudinally-extending track means on said frame, a unit movably supported on said track means and spanning said traveller run, means moving with said traveller and operable to establish, at times, a driving connection between said traveller and said unit, means resiliently resisting movement of said unit under the driving influence of said traveller, and means for maintaining a transverse relation between said unit and said traveller comprising a shaft transversely supported on said frame beyond one end of the travel path of said unit, a shaft transversely supported on said frame beyond the other end of the travel path of said unit, rotary means fixed to each of said shafts adjacent each side of said frame, and flexible strand means adjacent each side of said frame, each flexible strand means being fixed to said unit and being trained over both rotary means adjacent its side of said frame.

9. The organization of claim 8 in which each flexible strand means is bodily adjustable longitudinally of said frame relative to said unit.

10. The organization of claim 8 in which each rotary means is a sprocket and each flexible strand means is a chain having its ends secured to said unit.

11. The organization of claim 10 in which each end of each chain is secured to said unit through means adjustable relative to said unit in the direction of length of said frame.

12. The organization of claim 8 including auxiliary means for imparting to said unit a driving impulse in the direction of movement of said traveller run.

13. The organization of claim 12 in which said auxiliary means comprises a fluid motor.

14. In a device of the class described, a frame, an endless traveller supported on said frame and comprising two side chains spanned by transversely-extending members, means for driving said traveller to move one run thereof continuously in one direction longitudinally of said frame, a unit mounted on said frame for reciprocatory travel longitudinally of said frame and spanning said traveller, a cam trackway on said frame adjacent each of said chains within the course of one run, a plurality of dogs for each of said chains, each dog being pivoted to its chain and being provided with a portion engageable, at times, with the associated trackway to swing a portion of such dog into cooperative relation with said unit to establish a driving connection between its chain and said unit, and means resiliently resisting movement of said unit under such driving connection.

15. The organization of claim 14 in which said transversely-extending members are uniformly spaced apart in the direction of length of said frame, in which said unit carries cutting means having a blade, a portion of which traverses the plane occupied by the adjacent surfaces of said transversely-extending members when located in said one run, including means for shifting said cutting means between a position wholly beyond one lateral edge of said traveller run and a position wholly beyond the other lateral edge of said traveller run, and in which said dogs, when establishing such driving connection between said chains and said unit, are so positioned relative to said blade as to locate said blade portion wholly between adjacent, spaced transversely-extending members.

EARL R. OVERMAN.

REFERENCES CITED

The following references are of record in the file of this patent:

UNITED STATES PATENTS

| Number | Name | Date |
|---|---|---|
| 1,062,814 | Bernhardt | May 27, 1913 |
| 1,515,397 | Makowski | Nov. 11, 1924 |
| 1,710,898 | Rowley | Apr. 30, 1929 |
| 1,924,162 | Mason | Aug. 29, 1933 |

FOREIGN PATENTS

| Number | Country | Date |
|---|---|---|
| 363,818 | Germany | Nov. 14, 1922 |